United States Patent [19]

Gött et al.

[11] 4,064,385
[45] Dec. 20, 1977

[54] MULTIPOINT MESH WELDING MACHINE

[75] Inventors: Hans Gött; Josef Ritter; Klaus Ritter; Gerhard Ritter, all of Graz, Austria

[73] Assignee: EVG Entwicklungs-u. Verwertungs-Gesellschaft m.b.H., Graz, Austria

[21] Appl. No.: 625,489

[22] Filed: Oct. 24, 1975

[30] Foreign Application Priority Data

Oct. 28, 1974 Austria .................................. 8669/74

[51] Int. Cl.² ............................................. B23K 11/00
[52] U.S. Cl. ......................................... 219/56; 200/4; 200/16 B
[58] Field of Search ................. 200/4, 23, 16 B, 16 E, 200/163, 252; 219/56, 88

[56] References Cited

U.S. PATENT DOCUMENTS

| 3,424,888 | 1/1969 | Sommeregger et al. .......... 219/88 X |
| 3,493,697 | 2/1970 | Sedory ..................................... 200/4 |
| 3,567,891 | 3/1971 | Hinkelmann ....................... 200/16 B |

Primary Examiner—J. V. Truhe
Assistant Examiner—N. D. Herkamp
Attorney, Agent, or Firm—Ernest F. Marmorek

[57] ABSTRACT

The invention is concerned with a multipoint mesh welding machine having a row of electrode holders on one side of the working plane of the mesh. The electrode holders are selectively electrically connectable to one of a number of busbars extending across the machine by individual adjustable switching members.

6 Claims, 2 Drawing Figures

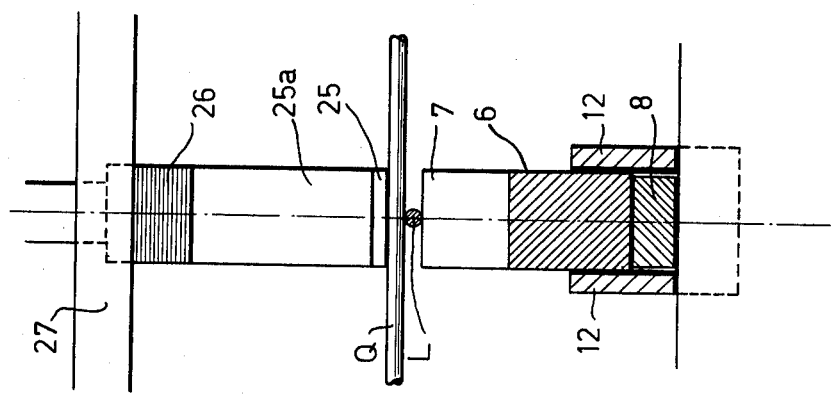
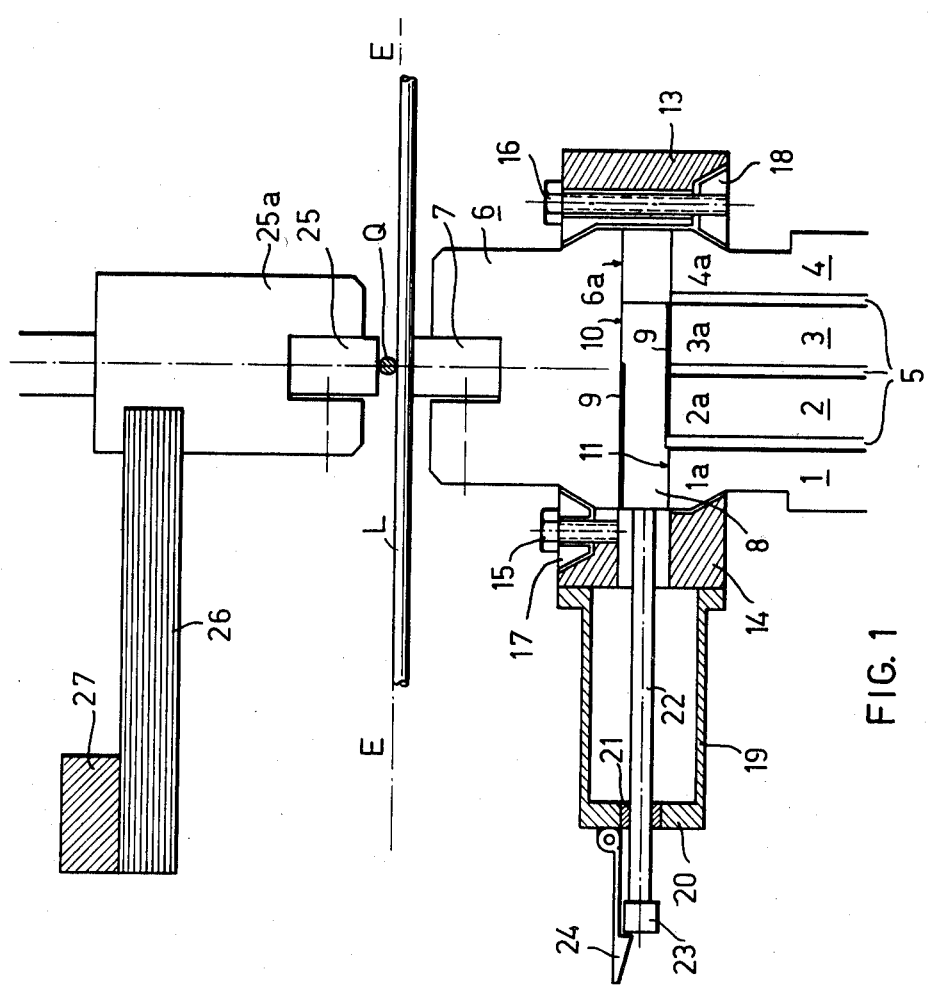

MULTIPOINT MESH WELDING MACHINE

In modern mesh welding machines for the production of welded mesh from wires crossing one another and welded together at their crossover points, busbars are frequently provided to feed the electric current to the welding electrodes.

On machines of this type the wires from which the mesh is to be manufactured are guided either between two rows of active electrodes lying opposite one another in pairs or between active electrodes which lie on the one side of the working plane of the mesh and passive current-bridges on the opposite sides of the plane. In the first case the welding voltage is applied to the active electrodes lying in pairs opposite one another across the plane and in each respective welding circuit only one individual point of cross of the wires is welded (individual spot welding). In the second, in general preferred, case two crossover points of the wires, connected by a current-bridge, are respectively fed by adjacent active electrodes of different polarity, so that the current flows from the active electrode of positive polarity through the first crossover point of the wires into the current-bridge and out of this through the second crossover point of the wires into the second active electrode of negative polarity, and in each welding circuit two points of crossover of the wires are welded in series (twin spot welding).

Grid welding machines are only in the rarest cases employed for the production of only one single type of mesh. As a rule a large number of different types of mesh have to be produced on one welding machine and it is usually required to be able to produce at option mesh with a predetermined basic pitch or with any multiple of this basic pitch.

With twin spot welding it is necessary, when changing over the welding machine from a basic pitch to a harmonic of this pitch, to switch off certain electrodes and reverse the polarity of others. For example, in the case of changeover from the smallest longitudinal wire spacing $a$ to the next coarser harmonic longitudinal wire spacing $2a$ every alternate electrode must be switched off and of the remaining electrodes every alternate one reversed in polarity.

From Austrian Patent Specification No. 264,992 a welding machine of the kind described is known, which has two busbars extending across the width of the machine and in which for rapid changeover to different longitudinal wire spacing the two busbars form on the same side of the machine contact surfaces for connection to the electrodes and between the electrodes and the contact surfaces on the busbars a contact jig is provided which extends across two or more adjacent electrodes and effects a selective connection between these electrodes and the contact surface of one or another busbar. For changeover of such a machine it is sufficient to exchange the contact jig for a jig of another form, for which purpose, however, first of all all the electrode holders must be dismantled and after exchange of the jig mounted again. Both with individual spot welding and also with twin spot welding it is further often required to change the welding voltage having regard to the treatment of wires of different diameters, i.e., either for all the electrodes or for certain groups of electrodes or only for individual electrodes. For this purpose too in the case of welding machines having electrodes fed via busbars, changing of the connections between the active electrodes is necessary.

In accordance with the invention, in a multipoint mesh welding machine, a row of welding electrode holders on one side of the working plane of the mesh are each electrically connectable to a selected one of at least two busbars, which extend across the machine transversely of the direction of advance of the mesh, by a respective adjustable switching member.

This construction provides in a particularly simple and timesaving way the feeding of the electrodes of a multipoint mesh welding machine from a selected one of a number of busbars and is particularly important for mesh welding machines of the kind having active electrodes and passive current-bridges on opposite sides of the working plane of the mesh.

In one position, each switching member may electrically isolate its electrode holder from all the busbars.

Preferably, each switching member is a body which is arranged to slide and/or to turn upon adjustment of the electrical connection and which has contact surfaces cooperating selectively with contact surfaces on the busbars and on the electrode holder. The activity necessary to changeover the machine is then reduced to one simple switching-over process in which the switching members are slid and/or turned into another position. Preferably, the contact surfaces of the busbars and of the electrode holder are parallel and facing one another and the switching member is a conductive sliding body with an essentially rectangular cross-section, which can be slid transversely to the busbars and has on its face next to the busbars a contact surface the width of which corresponds with the width of the contact surface on one busbar. A full contact is thus secured in a very simple way between the complementary contact surfaces.

In the case of a welding machine which, for example, in order to enable feeding of the electrodes with one of two selectable voltages of respectively selectable polarity, has four busbars, the machine is advantageously formed in such a way that the length of the sliding body is equal to the sum of the widths of the contact surfaces of three of the busbars, the opposite faces of the sliding body being partially covered with areas of insulation arranged offset with respect to one another in such a way that two conductive areas each equal in width to that of the contact surface of one busbar are exposed one at one end of one face and the other at the opposite end of the opposite face. As is described more closely below, in that case by withdrawing and turning the sliding body each electrode can be connected with any busbar or separated from all the busbars.

For clamping the electrode holder firmly a clamping device, onto which a guide for the sliding body is built, is advantageously provided. The sliding motions are then made easy and the different switching positions of the sliding body can be fixed by stops or catches.

Preferably, the sliding body can be withdrawn out of the space between the busbars and the electrode holder and can, by means of the guide, be turned about its longitudinal axis through 180° and then resinserted into its operative position between the busbars and the electrode holder. With the sliding body being thus continuously guided, sliding and turning of it for the possible switching positions in a compact overall construction is possible.

One example of a machine constructed in accordance with the invention is illustrated in the accompanying drawings, in which:

FIG. 1 is a partially sectioned diagrammetic side elevation of part of the machine; and, FIG. 2 is likewise a diagrammatic and partially sectioned front elevation of part of the machine.

In the illustrated machine, four busbars 1 to 4, which extend across the whole width of the mesh welding machine, are arranged closely adjacent to one another and separated from one another electrically by insulating separators 5. The top narrow sidefaces 1a to 4a of the four busbars, which are used as contact surfaces, lie in one common horizontal plane.

The bottom face of an electrode holder 6 into which the actual active electrode 7 is fixed by a clamp screw indicated only by a dotted line, is formed as a contact surface 6a parallel with the contact surfaces 1a to 4a on the busbars 1 to 4. Between the contact surfaces 1a to 4a and 6a is arranged a switching member formed as a rectangular sliding body 8 of electrically conductive material.

The opposite wide sidefaces of the sliding body 8 are partially covered over with insulating areas 9 arranged offset from one another in such a way that at the edges of the wide faces of the sliding body, which lie diagonally opposite one another, conductive zones 10, 11 remain free, which have each the width of one busbar.

In the switching position shown in FIG. 1 the sliding body 8 connects the busbar 1 to the active electrode 7.

If the sliding body 8 is slid out of the position shown towards the right by the width of one busbar the conductive zone 11 comes into contact with the busbar 2 and produces a conductive connection between the active electrode 7 and this busbar.

If on the other hand the sliding body 8 is turned about its longitudinal axis by 180° from the position shown, its conductive zone 10 comes into contact with the busbar 3 and the conductive zone 11 in that case produces a conductive connection with the electrode holder 6 and through this with the active electrode 7.

Finally by sliding the sliding body 8 in its turned position towards the right a conductive connection can also similarly be produced between the busbar 4 and the active electrode 7.

By means of a framelike clamping device, which consists of two sidepieces 12 and end pieces 13, 14, the electrode holder 6 can be clamped firmly onto the busbars 1 to 4. This is effected with the aid of clamp screws 15, 16 wedges 17, 18 and complementary oblique faces on the electrode holder, the outer busbars 1 and 4, the endpieces 13, 14 and the wedges 17, 18, which can be tightened up by means of the clamp screws 15, 16.

By areas of insulation not designated in greater detail but only indicated, all parts of the clamping device are insulated from the busbars and the electrode holder, so that no conductive connection can occur between these parts. The clamping devices which fully enclose the busbars in the region of the electrode holders and the bottom parts of the electrode holder, at the same time protect all the points of contact against soiling by weld spatter.

Onto each clamping device is fitted a chest 19 pointing in the longitudinal direction of the welding machine, the interior of which has a length that is somewhat bigger than the length of the sliding body 8 and a guidebush 21 is let into the front wall 20 of it. A rod 22 passing through this guidebush connects the sliding body 8 to a handle 23. The front wall 20 forms at the same time a stop by which the one end position of the sliding body 8 is fixed. For fixing the other end position a spring tongue 24 is provided which cooperates with the handle 23.

In order to be able to turn the sliding body 8 through 180° about its longitudinal axis, after raising the spring tongue 24 the handle 23 is pulled out until the sliding body 8 hits against the inside of the front wall 20, whereupon it can be turned unimpeded inside the chest 19.

In order to separate the electrode holder 6 from all the busbars 1 to 4 and thus to switch out the electrode 7 the sliding body only needs to be slid to the left (with respect to FIG. 1) until the conductive zone 11 has left the space between the busbars and the electrode holder. For this switching position of the sliding body a catch can be provided, for example, a catch on the spring tongue 24, into which the handle 23 snaps.

The top electrode 25 and electrode holder 25a which are only indicated, are connected by flexible leads 26 to a conductor bar 27 forming a passive current-bridge. Between the electrodes 7 and 25 a point of cross between a longitudinal wire L and a transverse wire Q is indicated. The families of longitudinal and transverse wires define the working plane E of production of the mesh.

We claim:

1. A multipoint mesh welding machine for use in manufacturing a mesh, comprising, in combination:
   a row of welding electrode holders on one side of said working plane;
   at least two busbars associated with each of said electrode holders, said mesh defining a working plane and including a direction of advancement, said busbars extending across said machine transverse of said direction of advancement;
   an adjustable switching means associated with each of said electrode holders and operable for electrically connecting its associated electrode holder to a selected one of its associate busbars;
   each of said electrode holders and its associated busbars including contact surfaces substantially parallel and facing one another; each of said switching means comprising a conductive body disposed between its associated welding electrode holder and busbars and being operable to be slid transversely to the associated busbars and including contact surface means for cooperating selectively with the contact surfaces on the associated busbars and electrode holder; said row of electrode holders being associated with four of said busbars and said sliding body having a length equal to the sum of the widths of said contact surfaces of three of said busbars, opposite faces of said sliding body being partially covered with areas of insulation arranged offset with respect to one another in such a way that two conductive areas each equal in width to that of said contact surface of one of said busbars are exposed one at one end of one of said opposite faces and the other at the opposite end of the opposite one of said opposite faces.

2. A machine according to claim 1, wherein each of said electrode holders is clamped onto said busbars by a clamping device carrying a guide for said sliding body.

3. A machine according to claim 2, wherein said sliding body can be withdrawn out of the space between said busbars and said electrode holder and can, by means of said guide, be turned about its longitudinal axis through 180° and then reinserted into its operative position between said busbars and said electrode holder.

4. A multipoint mesh welding machine for use in manufacturing a mesh, comprising, in combination:
- a row of welding electrode holders on one side of said working plane carrying a plurality of active electrodes;
- at least two busbars associated with each of said electrode holders, said mesh defining a working plane and including a direction of advancement, said busbars extending across said machine transverse of said direction of advancement;
- an adjustable switching means associated with each of said electrode holders and operable for electrically connecting its associated electrode holder to a selected one of its associated busbars;
- each of said electrode holders and its associated busbars including contact surfaces substantially parallel and facing one another; each of said switching means comprising a conductive body disposed between its associated welding electrode holder and busbars and being operable to be slid transversely to the associated busbars and including contact surface means for cooperating selectively with the contact surfaces on the associated busbars and electrode holder;
- clamping means in the vicinity of said electrode holders, said switching means, and said busbars for operatively clamping at least one of said electrode holders onto said busbars; and
- a plurality of passive electrodes disposed on the opposite side of said working plane and cooperating with said active electrodes.

5. The machine according to claim 4, wherein, in one position, each switching means electrically isolates its associated electrode holder from all its associated busbars.

6. The machine according to claim 4, wherein said switching means includes a face adjacent to one of said busbar contact surfaces, the width of said face being substantially the same as the width of said one contact surface.

* * * * *